US005719822A

United States Patent [19]

Wang

[11] Patent Number: 5,719,822

[45] Date of Patent: Feb. 17, 1998

[54] SEISMIC DATA RADON DIP MOVEOUT METHOD

[75] Inventor: Cheng-shu Wang, Denver, Colo.

[73] Assignee: Vector Seismic Data Processing, Inc., Denver, Colo.

[21] Appl. No.: 725,813

[22] Filed: Oct. 4, 1996

[51] Int. Cl.[6] .......... G01V 1/36

[52] U.S. Cl. .......... 367/53; 367/43; 367/46; 367/52; 364/421

[58] Field of Search .......... 367/43, 46, 52, 367/53; 364/421

[56] References Cited

U.S. PATENT DOCUMENTS

| | | | |
|---|---|---|---|
| 4,648,039 | 3/1987 | Devaney et al. | 364/421 |
| 4,742,497 | 5/1988 | Beasley et al. . | |
| 4,760,563 | 7/1988 | Beylkin . | |
| 4,766,574 | 8/1988 | Whitmore, Jr. et al. . | |
| 4,779,238 | 10/1988 | Howard . | |
| 4,878,204 | 10/1989 | Black et al. . | |
| 4,930,076 | 5/1990 | Meckley . | |
| 4,943,950 | 7/1990 | Beasley et al. . | |
| 5,097,452 | 3/1992 | Beasley . | |
| 5,138,583 | 8/1992 | Wason et al. . | |
| 5,150,332 | 9/1992 | Bale et al. . | |
| 5,206,837 | 4/1993 | Beasley et al. . | |
| 5,285,422 | 2/1994 | Gonzalez et al. . | |
| 5,450,370 | 9/1995 | Beasley et al. . | |
| 5,572,483 | 11/1996 | Chambers et al. | 367/38 |
| 5,583,825 | 12/1996 | Carrazzone et al. | 367/31 |

OTHER PUBLICATIONS

De Bazelaire et al, 53rd EAEG Mtg, May 26, 1991, pp. 56–57; abst only herewith.

Miller et al, Soc. Ind Appl. Meth et al, Proc. pp. 46–58: abstract only herewith.

Wang, C.S., 66th Annu. SEGTNT Mtgl, Nov. 10, 1996, vol. 2, pp. 1479–1482.

Wiggins et al, 52nd EAEG Mtg, May 31, 1990, abs. pp. 69–70. abst only herewith.

Bale, R., and Jakubowicz, H., Post–Stack Prestack Migration; GECO UK, England; 14, 714–717.

Black, James L. et al., Applications of Prestack Migration and Dip Moveout; Geophysical Service Inc., 8; 412–413.

Berg, Lars E.; 1984; PreStack Partial Migration; Geophysical Company of Norway A/S.

Deregowski, S.M., 1986, What is DMO?: First Break, 4, 7–24.

Deregowski, S.M., and Rocca, F., 1981, Geometrical Optics and Wave Theory of Constant Offset Section in Layered Media; Geophy. Prosp., 29, 374–406.

Duranni, T.S., and Bisset, D., 1984, The Radon Transform and Its Properties: Geophysics, 49, 1180–1187.

Hampson, Dan; The Discrete Radon Transform: A New Tool for Image Enhancement and Noise Suppression: 141–143.

Hampson, Dan: Dec. 1986; Inverse Velocity Stacking For Multiple Elimination; Journal of the Canadian Society of Exploration Geophysicists; 22; 44–55.

Hale, D., 1984, Dip–moveout by Fourier transform; Geophysics, 49, 741–757.

Ottolini, Richard, and Claerbout, Jon F.,; Mar. 1984; The Migration of common midpoint slant stacks; 49; 237–249.

Rothman, Daniel H. et al; Jan. 1985; Residual migration: Applications and limitations; Geophysics; 50; 110–126.

Russell, Brian et al.; Nov. 1990; Noise elimination and the Radon transform; Geophysics; 31–37.

Apr. 1987; Frequency–space Migration using the 45–degree algorithm; FSM; 1–3.

Finite–difference Modeling and Migration in Media with Laterally Variable Attenuation and Velocity; 89–107.

DMO Fundamentals; 2–1—2–17.

*Primary Examiner*—Nelson Moskowitz

*Attorney, Agent, or Firm*—Ancel W. Lewis, Jr.

[57] ABSTRACT

A method of processing seismic signal data that uses a special Radon transform for dip moveout (DMO) including the steps of applying conventional pre-DMO steps to the traces, applying a special Radon DMO transform to the traces to obtain a post-DMO section in Radon domain, applying a conventional inverse Radon transform to obtain a post-DMO section in space-time domain with a time and space DMO shift on the traces, and applying conventional post-DMO steps to the resultant traces.

7 Claims, 5 Drawing Sheets

1 APPLYING NORMAL MOVEMENT CORRECTION ON TRACES
2 SORTING TRACES INTO COMMON AZIMUTH GROUPS
3 SORTING TRACES INTO COMMON OFFSET SUBGROUPS
1A
4 APPLYING RADON DMO TRANSFORM TO TRACES
1B
5 APPLYING INVERSE RADON TRANSFORM
1C
6 RESORTING TRACES BY COMMON MIDPOINT
7 STACKING TRACES

SEISMIC DATA RADON DIP MOVEOUT METHOD

TECHNICAL FIELD

The present invention relates to a method of processing seismic data and more particularly to a method of processing seismic data using a Radon transform for Dip Moveout (DMO)correction.

BACKGROUND ART

The goal of seismic surveying is to map the subsurface structure of the earth by transmitting sound waves into the earth and collecting the reflected signals using an array of receivers at the surface. Seismic processing seeks to process the collected data and produce a true estimate of the structures' position and reflectivity.

Seismic traces are collected by a seismic survey. A trace is a time plot of the reflected energy recorded by a receiver. Each trace has an offset that is the distance from the source to the receiver, an azimuth that is the compass direction between the source and receiver, and a midpoint halfway between the source and receiver. A trace represents the travel times for sound signals to travel down from the source location to subsurface reflectors and back up to the receiver.

Seismic processing modifies each trace to represent the trace that would have been recorded if the source and receiver were at the midpoint. When the subsurface reflectors are horizontal normal moveout correction (NMO) is applied to map each point on a trace to the corresponding zero-offset time.

Common-depth-point stacking (CDP), also known as common-mid-point or common-reflection-point stacking, is a data processing method widely used in the seismic processing industry. The CDP method includes sorting seismic traces, prestack processing of the traces such as NMO and summing (stacking) traces with the same surface midpoint but from different source/receiver positions to attenuate unwanted signals.

However, in many situations the reflector of interest is not horizontal. A sloping or "dipping" reflector attenuates the image created by the traditional CDP stacking method. An extra prestack processing step, dip moveout correction or DMO, is added to the CDP method to correct for dipping reflectors. DMO is an important step in obtaining true amplitude and correct reflection position. DMO has become a standard processing step when dipping reflectors are present. DMO corrects finite-offset seismic data to a corresponding zero-offset data set, enabling stacking of both horizontal and dipping reflections with the same NMO correction.

DMO has been used in seismic data processing since 1978. The prior art methods of DMO are finite-difference, integral (Kirchoff-style) DMO and Fourier DMO. The integral DMO method is based on the 1981 paper by Deregowski and Rocca, "Geometrical Optics and Wave Theory of Constant Offset Sections in Layered Media". The Fourier DMO method is based on Hale's 1984 paper, "Dip-moveout by Fourier transform".

The integral DMO method is the current preferable method in the industry for irregularly sampled three dimensional datasets. Integral DMO uses constructive and destructive interference to yield zero offset reflections. When data is irregularly sampled, some points that should be canceled are not canceled, creating processing noise. The processing noise limits the effective application of integral DMO.

The Fourier DMO method is the industry standard for uniformly sampled two dimensional datasets. This method is relatively simple and is more accurate than the finite difference method for large offsets and steep dips. However, Fourier DMO attenuates signal frequency for steep dips and is not readily applicable to irregularly sampled three dimensional datasets.

The Radon transform was first presented by J. Radon in 1917 and is important in some mathematical fields. Generalized Radon transforms are widely used in many scientific fields. The Radon transform, known as "slant stack" in geophysics, has been in use in exploration seismology since the 1950s.

DISCLOSURE OF THE INVENTION

A method of processing seismic signal data disclosed includes first the conventional pre-dip-moveout steps of applying a normal moveout correction on seismic signal data traces from two dimensional and three dimensional seismic surveys, sorting the normal moveout correction traces into common azimuth groups wherein for two dimensional seismic surveys there is a single common azimuth group and for three dimensional seismic surveys there is a plurality of common azimuth groups, sorting the normal moveout corrected traces for each of azimuth groups into common offset groups, and then a novel step of applying a Radon dip moveout transform to the traces, the Radon dip moveout transform being characterized by mapping each point on each input trace to a hyperbola in Radon domain, the hyperbolas corresponding to reflections from a dipping reflector intersecting at one point in said Radon domain to provide improved amplitude preservation and high frequency preservation, and correct results for traces for a wide range of grouped offsets and irregularly sampled datasets. The Radon dip moveout transform being mathematically defined by the equation:

$$R(\tau,\theta)=\int f_n(x_m,\sqrt{t_n^2-h^2\tan^2\theta})\delta(L(\tau,\theta,x_m,t_n))\cdot J_T dx_n dt_n.$$

The Radon dip moveout transform being followed by applying a conventional inverse Radon transform to the previously Radon transformed traces, and by the conventional post-dip-moveout steps of resorting the inverse Radon transform traces into groups with a common midpoint between source and receiver, and stacking the resorted traces.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
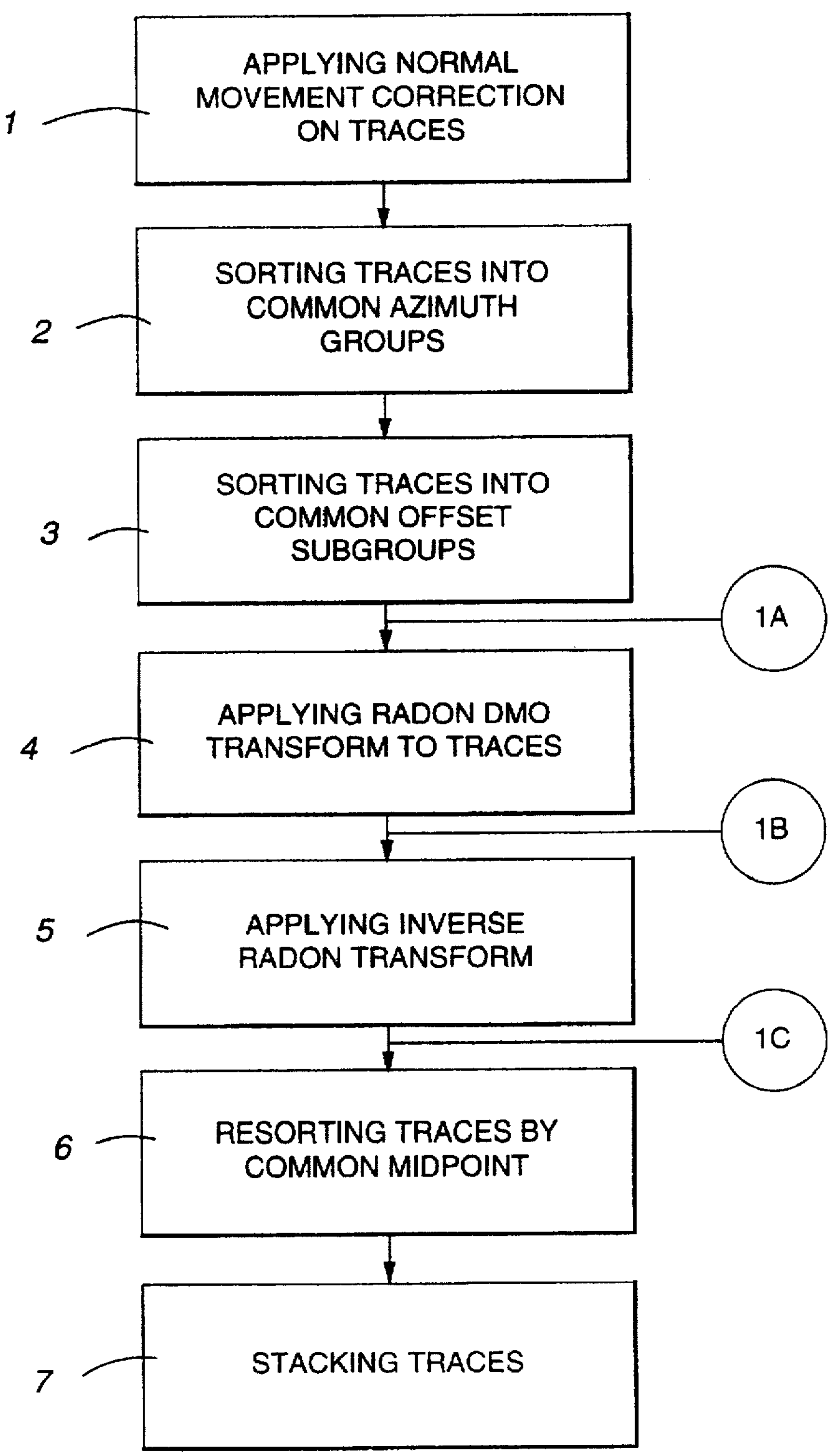
FIG. 1 is a flow diagram of the method.

Referring now to FIG. 1, the preferred embodiment of the method of processing seismic signal data traces according to the present invention is carried out by the steps shown in a flow chart to which successive numerals 1–7 corresponding to the steps have been applied:

1. Applying NMO on the traces.
2. Sorting traces into common azimuth groups.
3. Sorting traces in each common azimuth group into common offset subgroups.
4. Applying Radon DMO transform to each trace.
5. Applying inverse Radon transform.
6. Sorting traces into groups with common midpoint between source and receiver.
7. Stacking traces.

Normal Moveout

NMO converts the times on the trace to the times which would have been recorded if the source and receiver were both at the midpoint, and the reflector were horizontal. Note that all times are positive throughout this disclosure and time is positive below the horizontal axis in all figures. The NMO time, $t_n$, is the travel time for the signal from the midpoint to the flat reflector and back to the midpoint. The NMO time in a constant velocity medium is $t_n^2=t_r^2-4h^2/v^2$, where $t_r$ is the recorded time, h is the half-offset distance for the source/receiver pair, and v is velocity of the signal. For a flat reflector and a constant velocity medium the NMO time for the reflector will be the same for all source/receiver pairs with the same midpoint.

In surveys where the reflectors are horizontal, the NMO correction is applied to the traces. The traces are then stacked or summed together. The stacking reinforces real reflections and attenuates noise. The DMO correction is not necessary if the reflectors are horizontal.

Common Azimuth Groups

The azimuth is the compass direction of the surface line from the source to the receiver. Traces within a range of azimuths are sorted into a group. The range of each group is equal, for example the range may be 5°. The size of the range depends on the estimated dip of the reflectors.

A two dimensional survey constitutes a special case. If traces are collected in only one direction from the source there is only one common azimuth group. If traces are collected on both sides of the source, there are two common azimuth groups where one group has an azimuth 180° from the other group. However, these two groups are normally processed as a single group with traces in the 180° group having a negative x coordinate.

Common Offset Subgroups

Figure 1A:
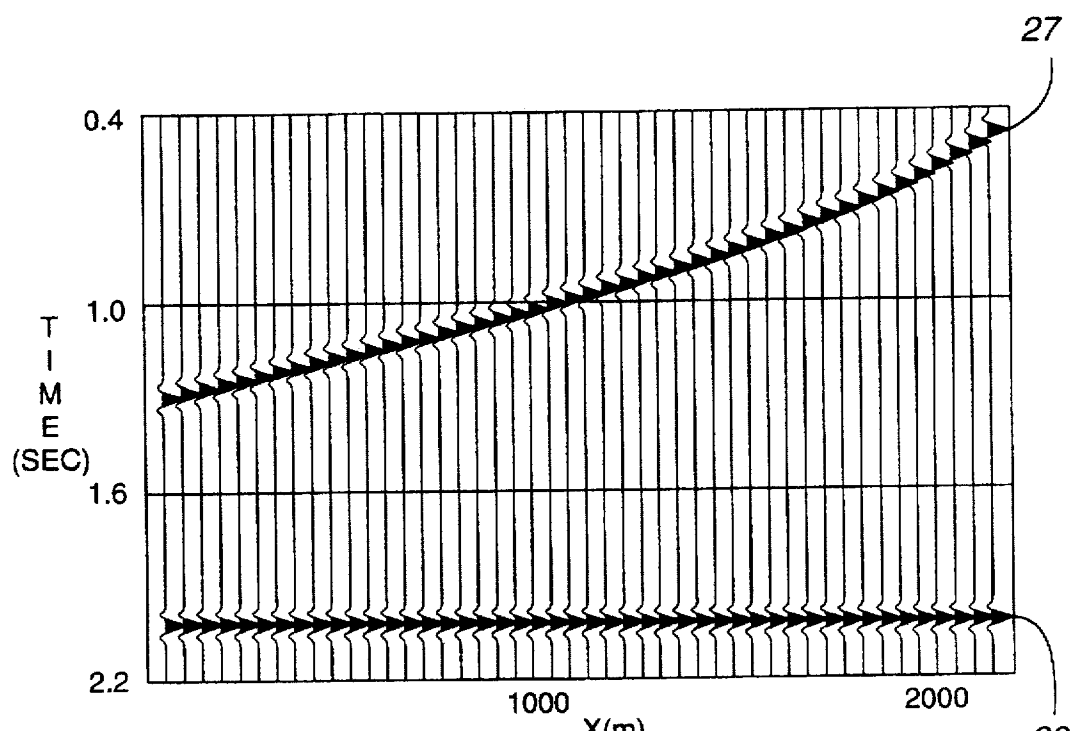
FIG. 1A is a diagram of the NMO corrected traces in a common offset subgroup.

The offset is the distance from the source to the receiver. Traces in each common azimuth group are sorted into subgroups. Each subgroup contains all traces from the common azimuth group within an offset range. A subgroup of common offset traces are shown in FIG. 1A.

The range of offsets that a subgroup may contain in the method of the present invention is broader than the allowable range for previous methods. Previous methods required the range to be the smallest range that could be achieved while assuring sufficient traces in each subgroup. The present invention can provide accurate DMO processing even if all of the traces in a common azimuth group were placed in a single common offset subgroup.

Radon DMO

The Radon DMO transform is a special Radon transform characterized by the mapping of each point on a trace to a hyperbola in Radon domain such that hyperbolas corresponding to reflections from one dipping reflector but from different traces intersect at a single point. The Radon DMO transform is based on the following considerations as developed below:

1. For each point on a trace there is an elliptical reflector in x-z domain representing all possible points of reflection,
2. The actual reflector is tangent to all elliptical reflectors corresponding to reflections off the actual reflector,
3. For each elliptical reflector there is a DMO ellipse in x-t domain where the x coordinate represents a lateral distance from the midpoint and the t coordinate is the two-way travel time of a zero-offset reflection from a dipping reflector,
4. For points of reflection off a dipping reflector on different traces the corresponding DMO ellipses are tangent to a single line,
5. The DMO ellipses transform into hyperbolas in Radon domain,
6. The hyperbolas corresponding to reflections off a dipping reflector in Radon domain intersect at a point,
7. The inverse transform of the point in Radon domain is the tangent line in x-t domain,
8. The DMO corrected time is the intersection of the tangent line and a normal line through the midpoint in x-z domain.

Elliptical Reflector

The slopes of the reflectors are not known at the time the survey is performed and cannot be determined from data from a single trace. For any given event on a trace the recorded time $t_r$ is the sum of the time from the source to the reflector and the time from the reflector to the receiver. The set of all possible points of reflection for an event on a trace may be represented by an ellipse with a first focus at the source position and a second focus at the receiver position.

Figure 2:
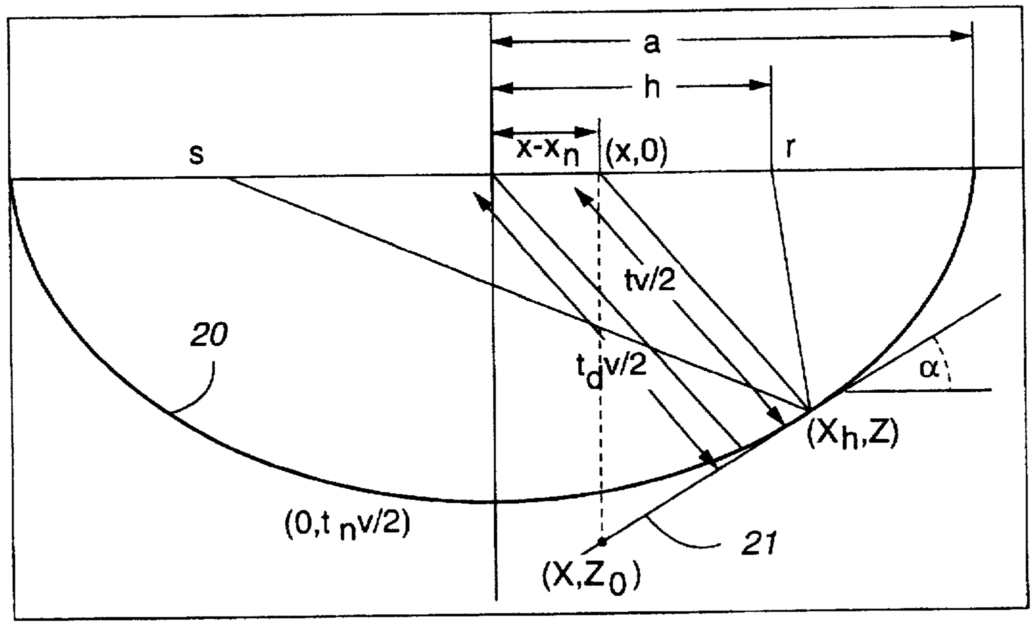
FIG. 2 is a diagram showing an elliptical reflector.

Referring to FIG. 2, the equation for this ellipse, known as an elliptical reflector 20, is $$\frac{(x_h-x_n)^2}{a^2}+\frac{z^2}{b^2}=1 \tag{1}$$

where $x_h$ is the lateral position relative to the origin, $x_n$ is the midpoint, $z=t_v v$ and $t_v$ is the vertical travel time on the elliptical reflector 20 at $x_h$. The constants a and b are respectively the major and minor semiaxes of the elliptical reflector 20 such that $a^2=(t_r v/2)^2=h^2+t_n^2v^2/4$ and $b=t_n v/2$.

The reflector 21 satisfies the equation $t_v v=x_h \tan\alpha+\tau_r$, for $\tau_r$ the intercept at $x_h=0$. The line described by this equation is tangent to each elliptical reflector 20 corresponding to a reflection off the reflector 21. The DMO corrected time, $t_d$, is on a line normal to the reflector 21 passing through the midpoint.

DMO Ellipse

Figure 3:
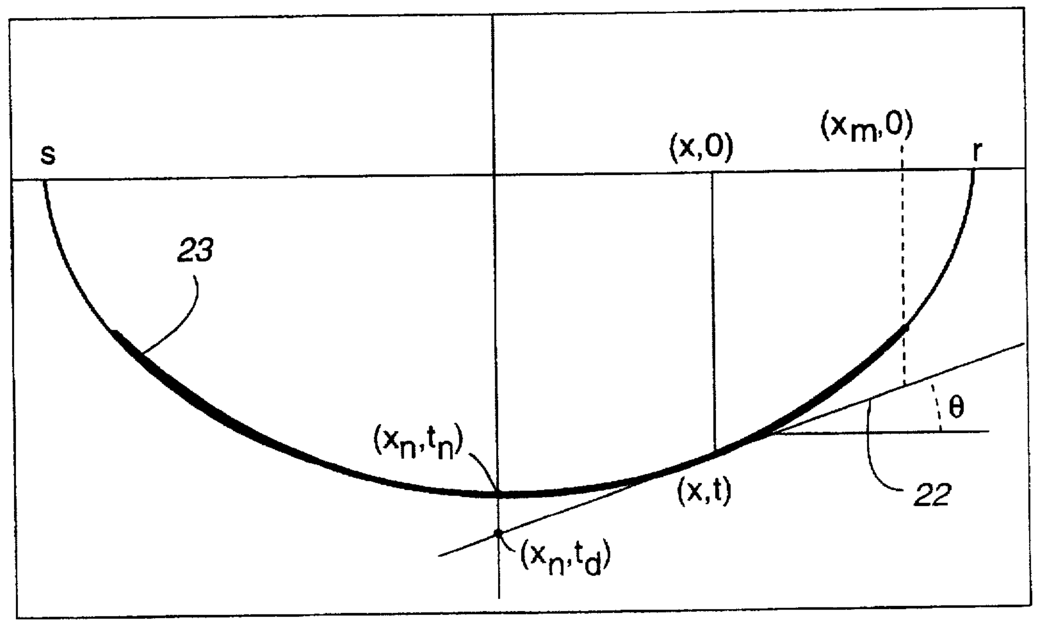
FIG. 3 is a diagram showing a DMO ellipse.

Referring to FIG. 3, the DMO ellipse 23 has the equation $$\frac{t^2}{t_n^2}+\frac{(x-x_n)^2}{h^2}=1 \tag{2}$$

Each point $(x_h, z)$ on the elliptical reflector 20 described above maps to a point (x,t) on the segment of the DMO ellipse 23 defined by $|x-x_n|\leq x_m-x_n=2h^2/vt_r$, and $t>0$. Referring again to FIG. 2, x is the distance from the midpoint to the point of intersection of the surface with a line normal to the dipping reflector 21 that passes through the reflection point. The distance tv is twice the distance from (x,0) to the point of reflection, $(x_h, z)$. The rate of change of t relative to x along the reflector 21 is $dt/dx=2\sin\alpha/v$, and $(t_d-t)=(x_n-x)2\sin\alpha/v$. Note $\alpha<0$ in FIG. 2.

Referring again to FIG. 3, for each point (x,t) there is a line 22 tangent to the DMO ellipse. The line 22 is described by the equation $t=px+\tau$, where $p=\tan\theta=dt/dx=2\sin\alpha/v$ and $\tau$ is the intercept with a vertical line at x=0. Since $(t_d-t)=(x_n-x)2\sin\alpha/v=(x_n-x)p$, the DMO corrected time $t_d$ is on this tangent line 22 at $x_n$. Note $\theta<0$ and $p<0$ in FIG. 3.

Figure 4:
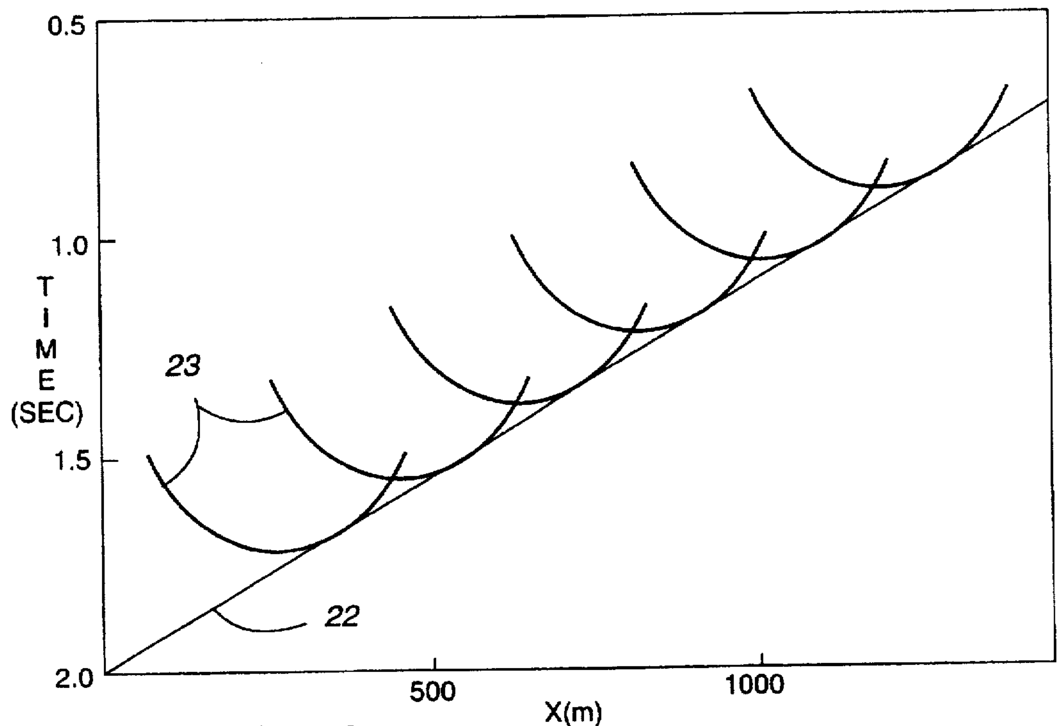
FIG. 4 is a diagram showing common offset DMO ellipses.

There exists a point $(x, z_o)$ that is on the line of the reflector 21 so that $z_o=t_ov=x\tan\alpha+\tau_r$. From FIG. 2, $t_ov\cos\alpha=tv/2$, so that $tv/(2\cos\alpha)=x\tan\alpha+\tau_r$. Multiplying both sides by $2\cos\alpha/v$ gives $t=2x\sin\alpha/v+2\tau_r\cos\alpha/v=px+\tau$, with $\tau=2\tau_r\cos\alpha/v$. Referring now to FIG. 4, the line 22 described by $t=px+\tau$ will be the tangent line 22 for the points of reflection for all DMO ellipses 23 corresponding to reflections off a specific reflector 21.

Radon Transform

The Radon transform maps a function f(x,t) in x-t domain to $U(p,\tau)$ in Radon domain where p is the slope of f(x,t) in x-t domain and $\tau$ is the intercept with the t axis of the line with slope p that intersects the point (x,t). For each point (x,t) on the curve f(x,t) in x-t domain there exists a line $t=px+\tau$. For example, if f(x,t) is a point, x=a,t=b where a and b are constants, then f(x,t) maps to the line $\tau=b-pa$ in Radon domain. If f(x,t) is a line, t=ax+b where a and b are constants, then f(x,t) maps to the point (b,a) in Radon domain.

The Radon transform is defined as $$R_{p\tau}\{f(x,t)\}=\int_{-\infty}^{\infty} f(x,\tau+px)dx \quad (3)$$

where f(x,t) is a function in x-t space and $t=px+\tau$. The above equation may be rewritten as a double integral by using the sampling property of the delta function as $$R_{p\tau}\{f(x,t)\}=\int_{-\infty}^{\infty}\int_{-\infty}^{\infty} f(x,t)\delta[t-(\tau+px)]dtdx \quad (4)$$

The Radon map of the DMO ellipse 23 defined by Equation 2 is a hyperbola denoted by the equation $$(\tau-px_n)^2=t_n^2+p^2h^2 \quad (5)$$

Figure 5:
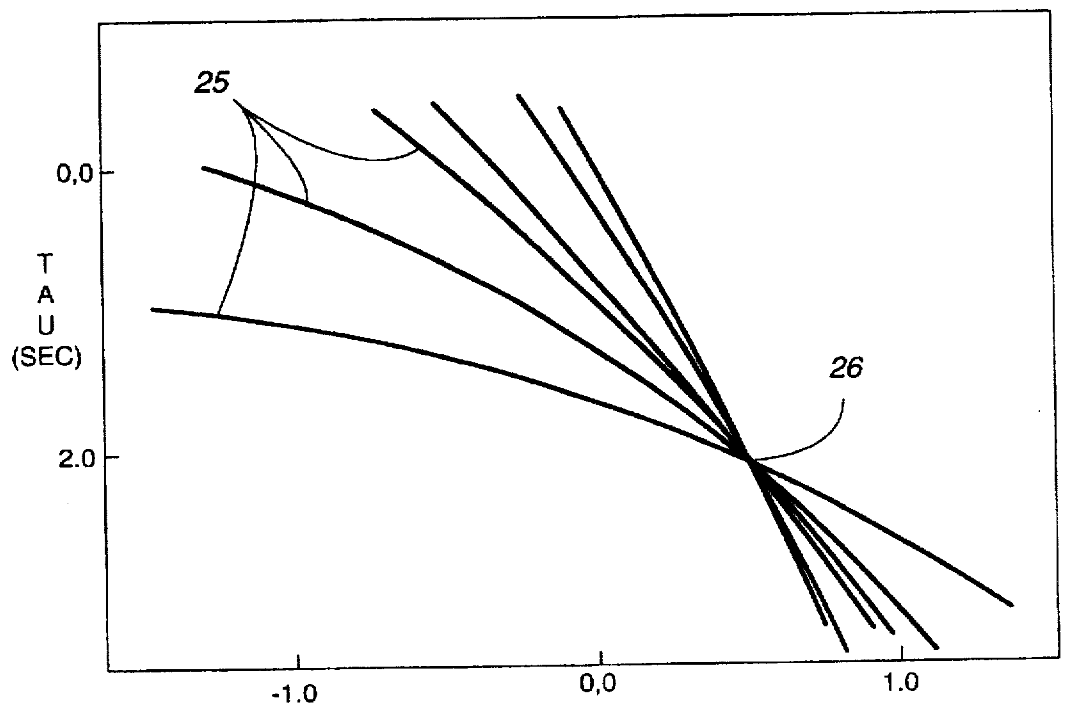
FIG. 5 is a diagram showing the intersection of Radon DMO hyperbolas in Radon domain.

Referring to FIG. 5, the hyperbolas 25 corresponding to reflections off a reflector intersect at one point 26. This point 26 is the DMO map of the points on the DMO ellipses 23 that have the same slope p and the same intercept $\tau$.

Radon DMO Transform

Let $\Delta x=x-x_n$. The equation for the DMO ellipse 23, $$\frac{t^2}{t_n^2}+\frac{\Delta x^2}{h^2}=1,$$

can be written in terms of t as $$t=t_n\sqrt{1-\frac{\Delta x^2}{h^2}} \quad (6)$$

so that the slope p of the tangent line 22 at (x,t) is $$p=\frac{dt}{dx}=\frac{-t_n\Delta x}{h\sqrt{h^2-\Delta x^2}} \quad (7)$$

The equation for the slope p may be written in terms of $\Delta x$ as:

$$\Delta x=\frac{-ph^2}{\sqrt{t_n^2+p^2h^2}} \quad (8)$$

Replacing $\Delta x$ from equation 8 in equation 6 for the DMO ellipse gives:

$$t=t_n\sqrt{1-\frac{\Delta x^2}{h^2}}=\frac{t_n^2}{\sqrt{t_n^2+p^2h^2}} \quad (9)$$

For a point $(x_1, t_1)$ on the DMO ellipse 23 the tangent line has the equation:

$$\frac{(x-x_n)(x_1-x_n)}{h^2}+\frac{tt_1}{t_n^2}=1, \quad (10)$$

so that at $x=x_n$ on the line $t_dt_1=t_n^2$. The DMO corrected time $t_d$ is:

$$t_d=\frac{t_n^2}{t}=\sqrt{t_n^2+p^2h^2}\ . \quad (11)$$

Since the points (x,t) and $(x_n,t_d)$ are both on the tangent line 22, equation 4 may be written as:

$$R_{p\tau}\{f(x,t)\}=\int_{-\infty}^{\infty}\int_{-\infty}^{\infty} f(x_n,t_d)\delta[t_d-(t+px_n)]dt_ddx_n. \quad (12)$$

Transforming the integral from x-t domain to $x_n-t_n$ domain gives:

$$R(\tau,\theta)=\int f_n(x_n,\sqrt{t_n^2-h^2\tan^2\theta})\delta(L(\tau,\theta,x_n,t_n))\cdot J_T dx_n dt_n \quad (13)$$

where $J_T=\frac{2A^2-1}{A^3}$ is the Jacobean and $$A=\left(1+\frac{\tan^2\theta h^2}{t_n^2}\right)^{1/2}.$$

$L(\tau,\theta,x_n,t_n)$ is a group of curves in $x_n-t_n$ space satisfying the function:

$$L(\tau,\theta,x_n,t_n)=t_n-\sqrt{(\tau+x_n\tan\theta)^2-h^2\tan^2\theta)}\ . \quad (14)$$

The Dirac delta function has the properties:

$$\delta(L(\tau,\theta,x_n,t_n))=0 \text{ if } L(\tau,\theta,x_n,t_n)\neq 0 \text{ and}$$

$$\int_{-\infty}^{\infty}\delta(L(\tau,\theta,x_n,t_n))dx_ndt_n=1.$$

Figure 1B:
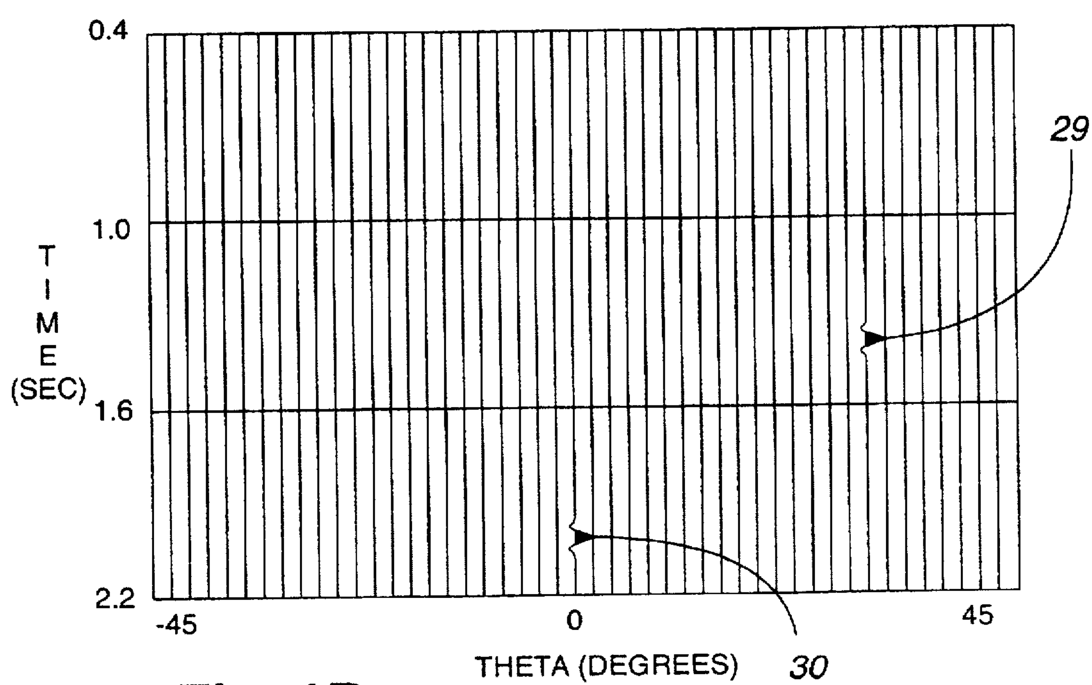
FIG. 1B is a diagram of the Radon DMO map of the common offset subgroup.

The Radon DMO transform performs the DMO correction. Referring to FIG. 1A, the upper group of impulses 27 represent reflections off a dipping reflector and the lower group of impulses 28 represent a horizontal reflector. The intercept of the upper group of impulses 27 is at about 1.3 seconds and the dip is about 30°, while the lower group of impulses 28 are at 2.0 seconds and 0°. Referring now to FIG. 1B, the energy for the upper group of impulses is concentrated at a point 29 at about 1.4 seconds and about 30° in Radon domain, while the energy for the lower group of traces is concentrated at a point 30 at 2.0 seconds and 0°. A correction of approximately 0.1 seconds was made by the Radon DMO transform for the reflections off the dipping reflector while no correction is made for the horizontal reflector.

Inverse Radon transform.

The inverse Radon transform is:

$$f(x,t)=\int_{-\infty}^{\infty}\frac{d}{dt}H\{R(t-x\tan\theta,\theta)\}d\theta, \quad (15)$$

where $H\{\cdot\}$ is the Hilbert transform operator. The inverse Radon transform is applied to the data in Radon domain, mapping points in Radon domain to DMO corrected traces. The inverse transform is the linear inverse Radon transform.

Figure 1C:
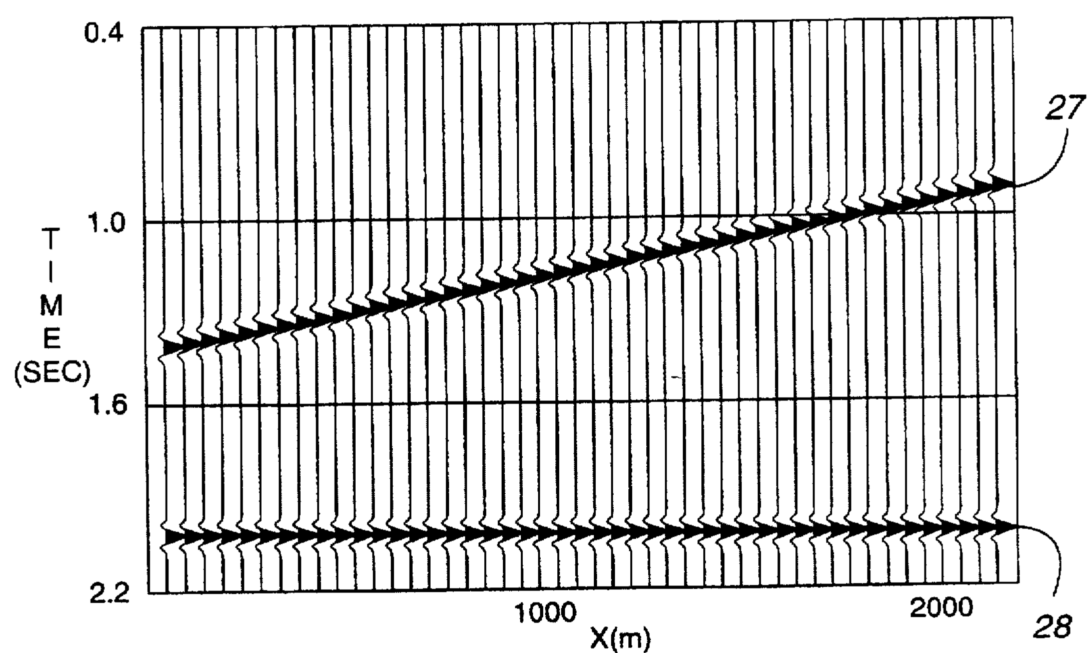
FIG. 1C is a diagram of the DMO corrected traces in the common offset subgroup.

Referring to FIG. 1C, the concentrations of energy from Radon domain map to impulses on each trace. Comparing FIGS. 1A and 1C, the upper group of impulses 27 has been DMO corrected so that the intercept is at about 1.4 seconds and the impulses 27 are linear along a line of about 30°, while the lower group of impulses 28 has not changed. Referring to FIG. 3, the DMO correction is the difference in time between $t_d$, the time after DMO, and $t_n$, the time before DMO.

Common Midpoint Groups

Traces are sorted so that all traces with different offsets but with the same midpoint are in the same group. The DMO corrected times for reflections off a particular reflector will be equal for traces within a group.

Stacking traces.

Traces are stacked or summed. Reflections off a dipping reflector have equal DMO corrected times so the reflector is reinforced while noise is attenuated.

Advantages of Radon DMO

Radon DMO provides improved frequency and amplitude preservation over previous methods. Radon DMO is an effective method of DMO correction for three dimensional seismic survey and is particularly suitable for irregularly sampled datasets.

What is claimed is:

1. A method of performing dip moveout correction on seismic traces from seismic surveys comprising the steps of:

applying a Radon dip moveout transform to said traces, said transform correcting said traces for dip in a dipping reflector, said Radon dip moveout transform being characterized by each point on each trace mapping to a curve in Radon domain, said curves corresponding to reflections from a dipping reflector intersecting at one intersection point in said Radon domain, said intersection point representing a Radon map of said dip moveout correction of said points, and applying an inverse linear Radon transform to the previously Radon transformed points.

2. A method of processing seismic signal data including seismic traces from seismic surveys which have been first subjected to pre-dip-moveout procedures and subsequently are subjected to post-dip-moveout procedures comprising the improved step of applying a Radon dip moveout transform to said traces after said pre-dip-moveout procedures, said transform correcting said traces for dip in a dipping reflector, said Radon dip moveout transform being characterized by each point on each trace mapping to a hyperbola in Radon domain, said hyperbolas corresponding to the reflections from a dipping reflector intersecting at one point in said Radon domain to make a time shift on each of said traces.

3. A method of performing dip moveout correction to seismic traces from two dimensional and three dimensional seismic surveys which have been previously subjected to a normal moveout correction and sorted into common azimuth groups comprising the steps of:

applying a Radon dip moveout transform to said traces, said transform correcting said traces for dip in a dipping reflector, said Radon dip moveout transform being characterized by each point on each trace mapping to a hyperbola in Radon domain, said hyperbolas corresponding to reflections from said dipping reflector intersecting at one point, said point representing the slope and intercept of said dipping reflector in said Radon domain to provide improved amplitude preservation and high frequency preservation and correct results for traces for a wide range of grouped offsets, and applying an inverse Radon transform to the previously Radon transformed traces.

4. A method as set forth in claim 3 including the further steps of:

sorting said traces into common offset subgroups prior to applying said Radon dip moveout transform, resorting said traces after applying said inverse Radon transform into groups with a common midpoint between source and receiver, and stacking said resorted traces.

5. A method as set forth in claim 3 wherein said Radon dip moveout transform applied to said traces is according to the equation:

$$R(\tau,\theta)=\int f_n(x_n,\sqrt{t_n^2-h^2\tan^2\theta})\delta(L(\tau,\theta,x_n,t_n))\cdot J_T dx_n dt_n$$

where:

$f_n(x_n,t_n)$ is a function in space-time domain before Radon transform $R(\tau,\theta)$ is the Radon map of $f_n(x_n,t_n)$ $\tan\theta$ is the slope $t_n$ is the normal moveout corrected time before DMO $x_n$ is the lateral distance along the common midpoint axis h is the half-offset $$J_T=\frac{2A^2-1}{A^3} \text{ is the Jacobean}$$

$$A=\left(1+\frac{\tan^2\theta h^2}{t_n^2}\right)^{1/2}$$

$$L(\tau,\theta,x_n,t_n)=t_n-\sqrt{(\tau+x_n\tan\theta)^2-h^2\tan^2\theta}$$

$$\delta(L(\tau,\theta,x_n,t_n))=0 \text{ if } L(\tau,\theta,x_n,t_n)\neq 0$$

and $$\int_{-\infty}^{\infty}\delta(L(\tau,\theta,x_n,t_n))dx_n dt_n=1.$$

6. A method as set forth in claim 3 wherein said inverse Radon transform is according to the equation:

$$f(x,t)=\int_{-\infty}^{\infty}\frac{d}{dt}H\{R(t-x\tan\theta,\theta)\}d\theta$$

where $H\{\cdot\}$ is the Hilbert transform operator.

7. A method of performing a dip moveout correction to traces from two dimensional and three dimensional seismic surveys comprising the steps of:

applying a normal moveout correction on said traces, sorting said normal moveout correction traces into common azimuth groups wherein for two dimensional seismic surveys there is a single common azimuth group and for three dimensional seismic surveys there is a plurality of common azimuth groups, sorting said normal moveout corrected traces from each of said single and said plurality of common azimuth groups into common offset subgroups, applying a Radon dip moveout transform to said traces, said Radon dip moveout transform being characterized by each point on each trace mapping to a hyperbola in Radon domain, said hyperbolas that correspond to reflections from a dipping reflector intersecting at one point in said Radon domain to provide improved amplitude preservation and higher frequency preservation and correct results for traces in a wider range of grouped offsets, applying an inverse Radon transform to the previously Radon transformed traces, resorting said inverse Radon transform traces into groups with a common midpoint between source and receiver, and stacking said resorted traces.

* * * * *